United States Patent [19]
Boyce et al.

[11] Patent Number: 6,101,241
[45] Date of Patent: Aug. 8, 2000

[54] TELEPHONE-BASED SPEECH RECOGNITION FOR DATA COLLECTION

[75] Inventors: Susan J. Boyce, Rumson; Lynne Shapiro Brotman, Westfield; Deborah W. Brown, Manalapan; Randy G. Goldberg, Princeton; Edward D. Haszto, Basking Ridge; Stephen M. Marcus, Atlantic Highlands; Richard R. Rosinski, Middletown; William R. Wetzel, Little Silver, all of N.J.

[73] Assignee: AT&T Corp., New York, N.Y.

[21] Appl. No.: 08/895,183

[22] Filed: Jul. 16, 1997

[51] Int. Cl.[7] ................................................ H04M 1/64
[52] U.S. Cl. ................................ 379/88.01; 379/2.79
[58] Field of Search ........................ 379/67.1, 88.01, 379/88.16, 88.17, 88.22, 101.01, 201; 704/2.4, 2.43, 2.52, 2.66, 2.79, 2.84

[56] References Cited

U.S. PATENT DOCUMENTS

| | | |
|---|---|---|
| Re. 34,587 | 4/1994 | Crane et al. . |
| 4,451,700 | 5/1984 | Kempner et al. . |
| 4,785,408 | 11/1988 | Britton et al. .................... 364/513.5 X |
| 4,866,756 | 9/1989 | Crane et al. . |
| 4,897,865 | 1/1990 | Canuel . |
| 4,922,520 | 5/1990 | Bernard et al. . |
| 5,131,045 | 7/1992 | Roth . |
| 5,255,309 | 10/1993 | Katz . |
| 5,303,299 | 4/1994 | Hunt et al. . |
| 5,375,164 | 12/1994 | Jennings . |
| 5,479,491 | 12/1995 | Herrero Garcia et al. . |
| 5,719,920 | 2/1998 | Harman ...................................... 379/88 |
| 5,737,487 | 4/1998 | Bellegarda et al. ................... 395/2.59 |
| 5,758,323 | 5/1998 | Case .......................................... 379/67 |

*Primary Examiner*—Scott L. Weaver

[57] ABSTRACT

A production script for interactions between participants and an automated data collection system is created by selectively tuning an experimental script through successive trials until a recognition rate of the system is at least an acceptability threshold. The data collection system uses a semi-constrained grammar, which is a practical accommodation of a larger range of possible inputs than a menu. The data collection system collects data by recognizing utterances from participants in accordance with the production script.

3 Claims, 2 Drawing Sheets

TELEPHONE-BASED SPEECH RECOGNITION FOR DATA COLLECTION

BACKGROUND OF THE INVENTION

The present invention relates to telephone-based data collection systems, and, more particularly, is directed to a voice recognition system using a script including prompts and corresponding recognition grammars which are empirically refined.

Many industries collect data from respondents by telephone. For qualitative information, a human agent is conventionally preferred. However, for certain applications, such as medical patient monitoring, dependence on human interviewers prohibitively increases the cost of gathering data as often as desired. For quantitative information, an automated data collection system is generally adequate, and in some cases may be preferred, e.g., people are more willing to give negative responses to an automated system than to a human agent. An automated system has the additonal advantage relative to a human agent of eliminating a subsequent data entry step.

In one known service offering, customers call a special phone number and respond to pre-recorded questions using a telephone keypad. Limitations of this service offering include lack of universal availability of dual tone multi-frequency telephones (rotary telephones provide out-of-voiceband signals, and so are unsuitable for data entry) and an awkward interface due to availability of only twelve keys. Also, some users are uncomfortable with providing information by "typing".

SUMMARY OF THE INVENTION

In accordance with an aspect of this invention, a method of creating a production script for interactions between participants and an automated data collection system is provided. The automated data collection system is operative in accordance with an experimental script. The method comprises conducting a trial in which a group of subjects provides utterances to the automated data collection system, and evaluating a recognition rate attained by the automated data collection system.

If the recognition rate is below an acceptability threshold, the experimental script is tuned. The step of conducting a trial is repeated using the tuned experimental script, and the step of evaluating the recognition rate is also repeated.

If the recognition rate is at least the acceptability threshold, then the experimental script, as selectively tuned, is used as the production script.

It is not intended that the invention be summarized here in its entirety. Rather, further features, aspects and advantages of the invention are set forth in or are apparent from the following description and drawings.

DETAILED DESCRIPTION OF THE PREFERRED EMBODIMENTS

Figure 1:
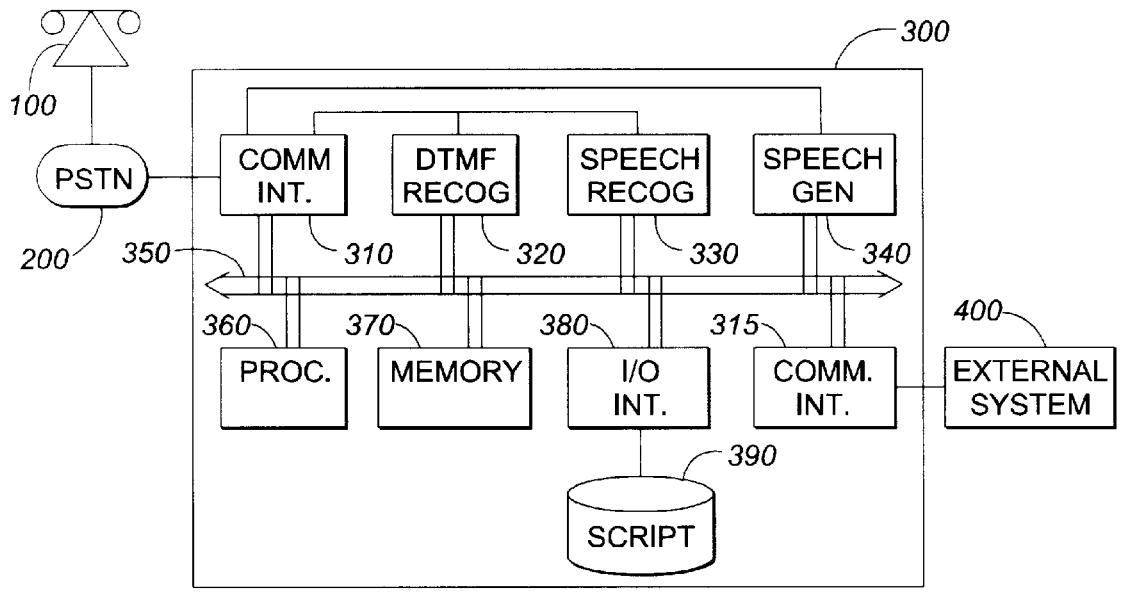
FIG. 1 is a block diagram of a telephone-based data collection system.

FIG. 1 shows a typical environment for a telephone-based data collection system. A telephone set 100 having a standard key set (0, 1, . . . , 9, *, #) is used by a participant, such as from the participant's home or office. As used herein, a participant means a person providing information for collection to an automated data collection system.

Telecommunication network 200 comprises dial telephone lines and well-known switching equipment such as stored program control switches.

Data collection system 300 comprises communication interface 310 to network 200, communication interface 315 to external system 400, dual tone multi-frequency (DTMF) signal recognition circuit 320, speech recognition circuit 330, speech generation/replay circuit 340, data bus 350, processor 360, memory 370, disk interface 380 and disk storage 390. Data collection system 300 is located within a network operated by a communication network operator. In other embodiments, data collection system 300 may be external to the network operated by the communication network operator.

Communication interface 310 functions to receive and place calls through network 200 under control of processor 360. Communication interface 310 supplies inbound call signals from network 200 to recognition circuits 320, 330, and receives outbound call signals from generation/replay circuit 340 for delivery to network 200.

Communication interface 315 functions to transmit data to and receive data from external system 400 under control of processor 360. In some embodiments, communication interface 315 interfaces to PSTN 200, rather than a dedicated communication line (as shown).

DTMF signal recognition circuit 320 functions to recognize a DTMF signal produced by depression of a key on telephone set 100, to convert the DTMF signal to digital data and to supply the digital data to processor 360 via data bus 350.

Speech recognition circuit 330 is adapted to receive a speech signal spoken by a participant to telephone set 100, to process the speech signal to obtain a word string or determination that the speech signal is unrecognizable, and to deliver its processing results to processor 360 via data bus 350.

Speech generation/replay circuit 340 is adapted to receive a control signal from processor 360 via data bus 350, and in response thereto, to generate a speech signal or to replay a pre-recorded speech signal, and to provide the generated or replayed speech signal to communications interface 310.

Processor 360 serves to control circuits 310, 320, 330 and 340 to collect information from participants in accordance with a predetermined script including prompts and corresponding recognition grammars, to store the collected information and to make the stored information available to a recipient of the information. Processor 360 is operative in conjunction with memory 370, disk interface 380 and disk storage 390 in a conventional manner which is well-known to one of ordinary skill in the art. It will be appreciated that the predetermined script is stored on disk storage 390. At initialization of data collection system 300, typically when power is supplied thereto, appropriate portions of the predetermined script are loaded into memory 370.

An important feature of the present invention is the ability to provide a semi-constrained vocabulary recognition response grammar. That is, rather than requiring a caller to enter data via manual entry on a telephone keypad, a data collection system according to the present invention supports very flexible speech recognition. The data collection system does not require "training" for each caller, but rather can accommodate new callers. The data collection system is not limited to a small recognition vocabulary, but rather accommodates a conversational style dialog with a caller. However, the recognition grammar is semi-constrained in accordance with an empirical grammar construction process, described in detail below.

To support a larger participant community, various elements of the system shown in FIG. 1 may be replicated. For example, to support a plurality of simultaneous calls, multiple occurrences of communication interface 310, DTMF signal recognition circuit 320, speech recognition circuit 330, and speech generation/replay circuit 340 may be provided.

Typical applications for the data collection system 300 include collection of medical data from patients; collection of purchase information from customers, e.g., to make a rental car reservation or to order merchandise or services; and collection of survey data from subjects.

Initially, the recipient of information (such as a hospital or company testing a new drug) sets up a script for the service dialog, and registers participants (such as doctors and patients) possibly including a voice print for verification. For applications involving confirmation of the caller's identity, multiple levels of verification may be elected by the recipient of information, such as tiers of verification.

On a regular or as needed basis, patients call in to provide information, such as:

| | |
|---|---|
| System | How are you feeling on a scale of one to five, with one being very good and five being very poor? |
| Patient | Ummm. . .three. |
| System | You're feeling fair. Is that correct? |
| Patient | Yes. |

Generally, a participant employs telephone set 100 to dial a call through network 200 to data collection system 300 which is configured to receive the participant's call and engage the participant in a speech based dialog to collect mostly spoken information. Using automated speech recognition, data collection system 300 converts the spoken information into response data, which is verified with the speaker via voice synthesis or pre-recorded segments. The speech recognition supports "word spotting" (the desired response is recognized from a longer utterance) and "barge in" (the speaker utters something before the system has completed its spoken question or instruction). An example of word spotting is processing "Ummm . . . three" to extract the response "three".

When data collection system 300 is used to interview an out-patient at a mental hospital, a prompt may be:

System Please state all of the drugs that you are presently taking.

The semi-constrained vocabulary recognition response grammar is all of the drugs prescribed by the mental hospital. An example grammar is:

| | | |
|---|---|---|
| ativan | lithium | stelazine |
| buspar | luvox | symmetryl |
| clozaril | paxil | thorazine |
| cogentin | prolixin | tofranil |
| depakote | prozac | xanax |
| haldol | risperidol | zoloft |
| klonopin | ritalin | zyprexa |

It will be appreciated that, as the list of allowable responses grows, is it much more convenient for the participant to respond to an open-ended question which has a semi-constrained response vocabulary than for the participant to listen to a menu and enter a selection, possibly with a delimiter. An open-ended question is particularly convenient when the participant is being asked about information which they know, e.g., personal statistics or desired selection, and thus for which they do not require a menu.

In some embodiments, data collection system 300 also includes speaker verification based on voice prints, which entails registration of participants including provision of a baseline voice print; confirmation of caller identity, such as by provision of prerecorded distinguishing information (e.g., mother's maiden name); call transfer, e.g., to voice mail services or a person; and outbound calling to participants to collect information, or as a reminder to call the automated system and provide information.

The collected response data are disseminated as printed reports, possibly transmitted via facsimile or as digital data. In some embodiments, the collected response data are made available through a voice based interface tailored for the recipient of information, e.g., the recipient calls data collection system 300 and queries the status of selected participants and/or newly collected information. In some embodiments, data collection system 300 processes the collected data, e.g., detects predetermined events, or makes the collected data available to a separate data processing system (not shown).

External system 400 may be used to supply data to data collection system 300, e.g., a daily update of scheduling information or real-time reservation availability. External system 400 may additionally or alternatively be a destination for information collected by data collection system 300.

Figure 2:
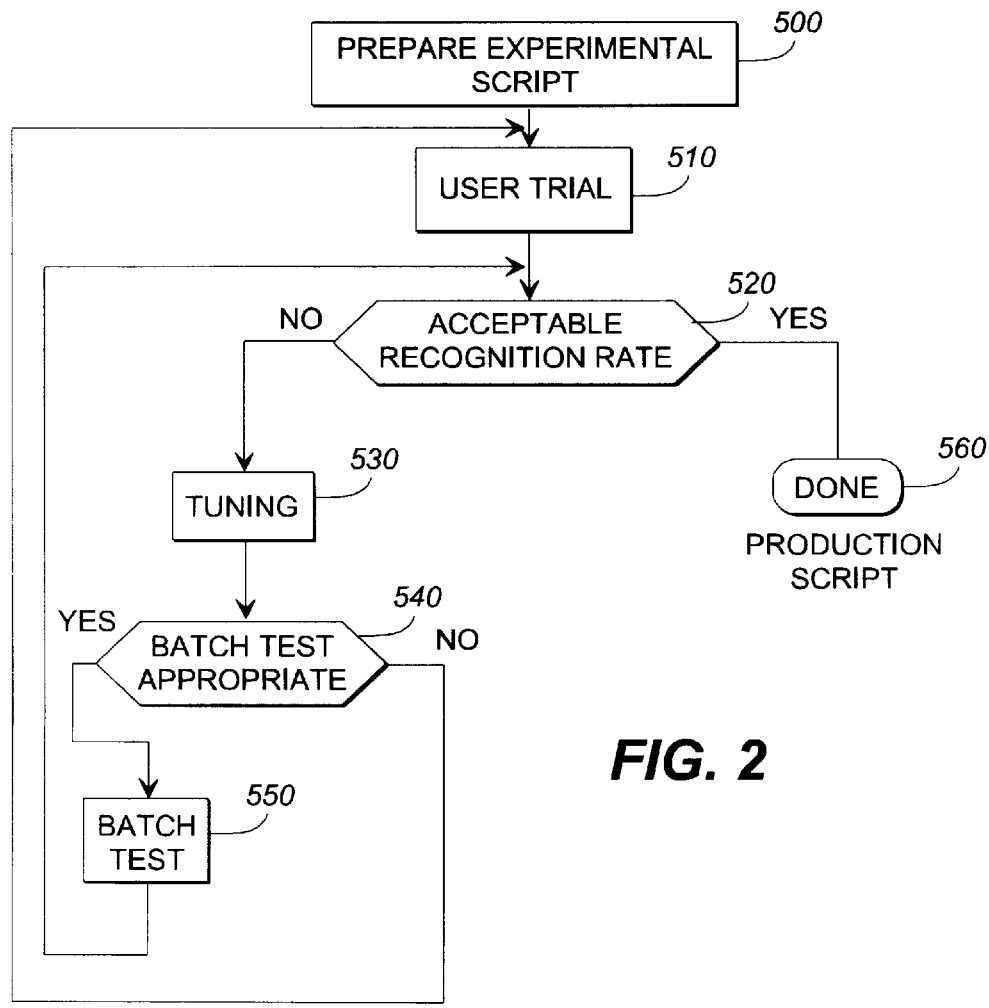
FIG. 2 is a flowchart referred to in describing how the software for the data collection system of FIG. 1 is produced.

FIG. 2 is a flowchart showing how the predetermined script including prompts and corresponding recognition grammars used by data collection system 300 is produced.

At step 500, an experimental script is prepared. Typically, producers of the script provide their best guesses as to (i) the sequence and phrasing of questions most likely to elicit desired information from participants, that is, the prompts, and (ii) the types of responses which participants are most likely to give. Based on the most likely responses, a recognition grammar is created. If a response is not understood, provision of a question to elicit understandable information, referred to as re-prompting, may be included as part of the script. How extensively re-prompting is employed depends on the criticality of the information and the motivation of the participant, e.g., a patient versus an anonymous caller.

At step 510, a trial of the experimental script is conducted with a test group of participants. The participants' responses are recorded.

At step 520, the results of the trial are analyzed, and an overall recognition rate is obtained. In most cases, selected questions exhibit a low recognition rate, while other questions have an acceptable recognition rate.

The recognition rate of the data collection system 300 is defind as follows:

$$\text{Recognition Rate} = \frac{\text{Correct Recognitions}}{\text{Total Attempted Recognitions}}$$

where
Correct Recognitions=IN_ACCEPT+OUT_REJECT
Total Attempted Recognitions=Correct Recognitions+ IN_REJECT+OUT_ACCEPT
IN_ACCEPT=responses in grammar that were accepted
IN_REJECT=responses in grammar that were rejected OUT_ACCEPT=responses out of grammar that were accepted OUT_REJECT=responses out of grammar that were rejected At step 530, tuning is performed to improve the recognition rate. Tuning is discussed in detail below. Most of the tuning is performed manually. The result of step 530 is a revised experimental script. Tuning is an important aspect of creation of a semi-constrained grammar.

At step 540, it is determined whether the revised experimental script is appropriate for batch testing. Generally, if the changes made during tuning do not affect the prompts or prompt sequence, then batch testing is appropriate.

If batch testing is appropriate, at step 550, a batch test is conducted. Batch testing is rerunning collected data with a revised speech recognition system, and is generally faster and more economical than another user trial.

If, at step 540, it is determined that batch testing is inappropriate, step 510 is repeated using the revised experimental script. In most cases, user trials are conducted with a test group having participants other than those who participated in a previous user trial.

Step 520 is repeated on the results of the most recent user testing or batch trial. If the recognition rate is unacceptable, the tuning, testing, trial and acceptability steps 530, 540, 510 and 520, respectively, are repeated until the recognition rate attains an acceptable threshold.

When an acceptable recognition rate is attained, the experimental script used in the associated trial is defind to be the production script, and, at step 560, the process of producing the predefined (or production) script is complete.

Figure 3:
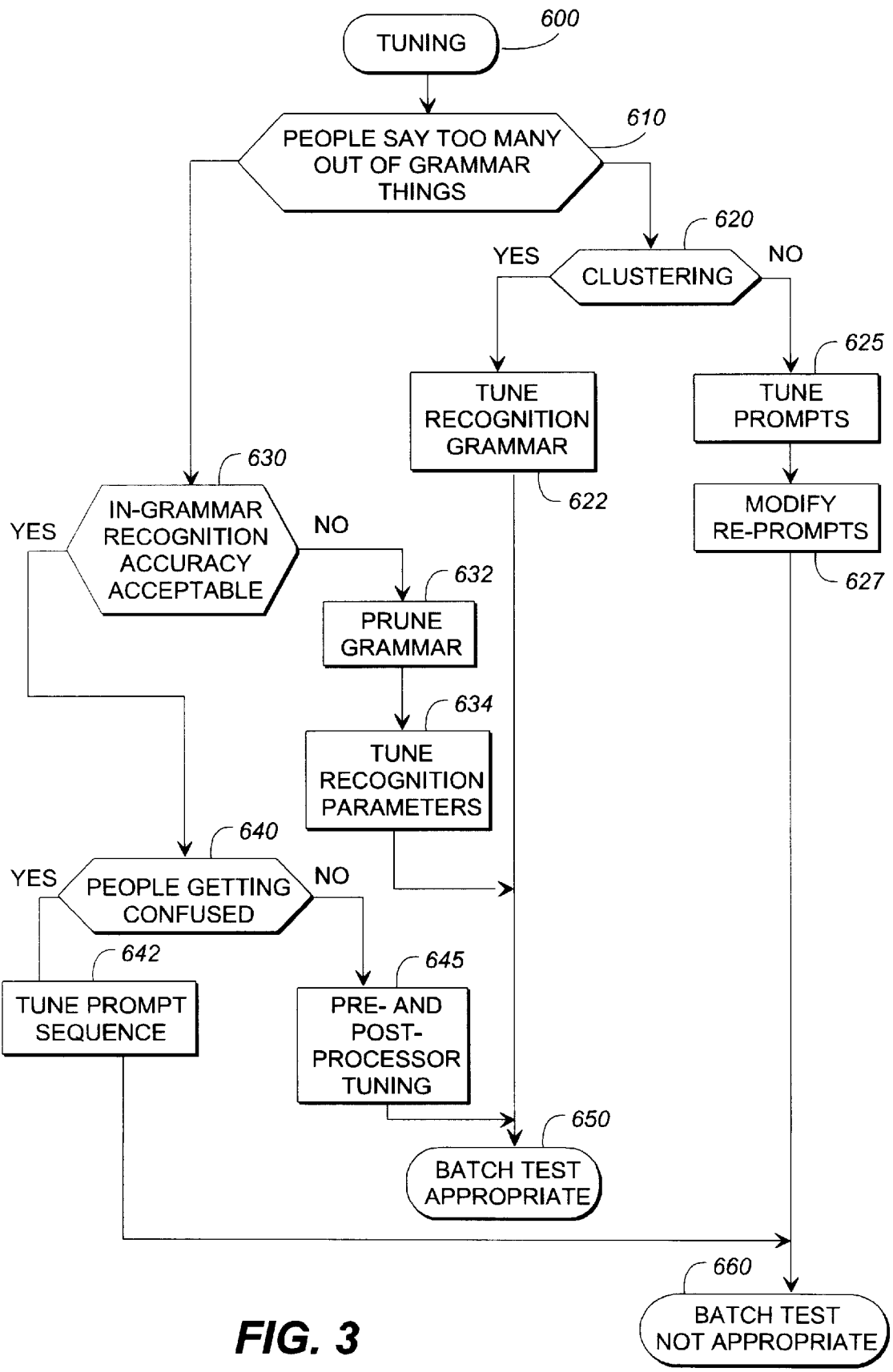
FIG. 3 is a flowchart of the tuning process referenced in FIG. 2.

FIG. 3 is a flowchart of the tuning process shown in step 530 of FIG. 2. Much of the tuning process is performed manually, and the order in which the various tuning techniques are applied varies from artisan to artisan. The tuning techniques typically used include tuning the recognition grammar, tuning prompts, modifying re-prompts, pruning the grammar, tuning recognition parameters, pre- and post-processor tuning, and tuning the sequence of prompts. Other tuning techniques may also be used.

Tuning the recognition grammar refers to expanding the recognition grammar to include what people say, for example, a larger vocabulary of substantive responses, surrounding prepositions, and surrounding phrases.

Pruning the grammar refers to excluding rarely used words from the recognition grammar. Interestingly, although removing rarely used words ensures a recognition error when a participant says the removed word, the performance improvement in misrecognitions, that is, the reduction in recognition errors for more frequently said words which are misrecognized as one of the rarely used words, can be larger than the performance degradation due to the ensured errors.

Tuning recognition parameters refers to adjusting the parameters of the software used in speech recognition circuit 330. Recognition software is available from various vendors such as the HARK™ Telephony Recognizer, Release 3.0, from Bolt, Beranek and Newman, Cambridge, Mass. 02138, described in Document No. 300-3.0 (July 1995), the disclosure of which is hereby incorporated by reference. An example of a recognition parameter is the "rejection parameter", which attempts to maximize the "proper rejections" curve and minimize the "false rejections" curve, which typically have different shapes. The rejection parameter is usually computed to maximize the following expression:

(proper rejections)−(false rejections)
=OUT_REJECT−IN_REJECT

Another example of a recognition parameter is speaker gender sensitivity.

Tuning prompts refers to changing a prompt. An example is provided below (changing PROMPT 2 of the experimental script discussed below).

Modifying re-prompts refers to adding re-prompts or altering re-prompts, which are used when the recognition system fails to recognize a response. An example is provided below (adding PROMPT R1 of the experimental script discussed below).

Tuning the sequence of prompts refers to changing the order in which prompts are presented. The purpose is to provide a better context for the participant, thereby avoiding errors due to participant confusion.

Pre- and post-processor tuning refers to altering how external information is employed by speech recognition circuit 330 and processor 360. An example of external information is an account number or a confusion matrix. Processor 360 may use the output of speech recognition circuit 330 to enhance account number recognition.

An example of post-processor tuning is using a confusion matrix to improve the recognition accuracy. Use of confusion matrices with account numbers is described in application Ser. No. 08/763,382 (attorney docket no. BROWN 1-3-1-3), the disclosure of which is hereby incorporated by reference.

An example of pre-processor tuning is constraining the account numbers which may exist to improve recognition accuracy. Choosing alpha-numerics to improve recognition accuracy is described in application Ser. No. 08/771,356 (attorney docket no. BROWN 2-4-1-4-3), the disclosure of which is hereby incorporated by reference.

At step 600 of FIG. 3, the results of a user trial conducted at step 510 of FIG. 2 are analyzed.

If, at step 610, it is determined that a sufficient percentage of responses were out of grammar, then at step 620, the out of grammar responses are analyzed to determine whether they are clustered or grouped. A sufficient percentage may be, for example, at least 10% of the responses. If the responses are clustered, at step 622, the recognition grammar is augmented (expanded) to include what people actually said, and a batch test can be performed to evaluate the results of the grammar tuning. Step 622 can be performed entirely by a computer programmed appropriately. If the responses are not clustered, then at step 625, the prompts are tuned, and at step 627 the re-prompts are adjusted. After modifying the prompts or re-prompts, a batch test is inappropriate, so a user trial should be performed.

If, at step 610, it was determined that an out of grammar situation was not present, then at step 630, it is determined whether the in-grammar recognition accuracy is low, for example, less than 80% correct recognition of in grammar responses. If the in-grammar recognition accuracy is low, then at step 632, the grammar is pruned and at step 634, the recognition parameters are tuned. Step 632 can be performed entirely by a computer programmed appropriately. A batch test may be performed to evaluate the results of the grammar and parameter tuning.

If, at step 630, it is determined that the in-grammar recognition accuracy is acceptable, then at step 640, it is determined whether the responses indicate that people are getting confused, for example, by giving wholly inappropriate responses to certain prompts. If people are getting confused, then, at step 642, the prompt sequence is modified, and the prompts and re-prompts may also be adjusted.

If, at step 640, it is determined that people are not confused, i.e., their out-of-grammar responses are not clustered, then at step 645, pre-processor tuning and post-processor tuning are performed. A batch test may be performed to evaluate the results of the pre-processor and post-processor tuning.

An example of production of a script will now be discussed. The application is a system for collecting information for car rental reservations.

An experimental script included the following prompts and corresponding grammars, where triangular brackets (<>) indicate that a word in the indicated category is expected:

---

PROMPT 1: Where will you be renting?
    The recognition grammar for PROMPT 1 was
        <AIRPORT>
        <CITY><STATE>
        <CITY><STATE><AIRPORT>
PROMPT 2: Picking up and returning back to <LOCATION> ?
    The recognition grammar for PROMPT 2 was:
        YES
        NO

---

A first trial was conducted. The recognition rate was about 70%, that is, 30% of the participants said things that could not be processed by the telephone data collection system. This recognition rate was unacceptable. Tuning was performed, as described below. The responses to PROMPT 1 included:

Chicago from O-Hare

O-Hare

Chicago O-Hare

O-Hare Airport

Chicago O-Hare Airport

New York

JFK Airport at JFK from Newark Airport uh landing urn at Newark

Kennedy International

Los Angeles

L-A-X Airport

L-A-X

LA International

Participants used many variations on place names, occasionally added prepositions to their responses, and provided extraneous utterances such as "uh", "ah", "um", "er" and so on. The grammar was adjusted to account for this.

The responses to PROMPT 2 were quite varied, so the prompt was eliminated, and the following prompts used in place thereof:

PROMPT 2A: Are you returning to the same location?

PROMPT 2B: Where will you be returning the car?

Additionally, re-prompting capability was added, including:

PROMPT R1: I'm sorry, I didn't understand what you said.

If a complete sentence was provided as an answer, re-prompting was considered faster than trying to extract information from the sentence.

For ambiguous airports and cities, additional prompting was added:

PROMPT 1A: Is that Charleston, S.C. or Charleston, W. Va. ?

PROMPT 1B: Is that Boston, Mass. or Austin, Tex.?

PROMPT 1C: Is that Columbus, Ohio, Columbus, Miss. or Columbus, Ga.?

PROMPT 1D: Is that Portland, Oreg. or Portland, Me.?

PROMPT 1E: Is that Washington, National, Dulles or BWI?

PROMPT 1F: Is that Dulles International or Dallas, Tex.?

PROMPT 1G: Is that JFK, Laguardia or Newark International?

Also, at any point, if the participant said "help", an appropriate response was provided.

A second trial was conducted, and the responses were recorded. The recognition rate was about 90%, that is, 10% of the participants said things that could not be processed by the telephone data collection system. This recognition rate was unacceptable. Tuning was performed. The speech models used in the recognizer were changed to include large country-wide speech data, that is, more regional pronunciations were accommodated. Also, the speech models were changed to incorporate better phoneme recognition. Better rejection was added to the grammar. For example, if a response of "um" or "er" was provided, the system repeated the question.

A third trial was conducted, in which the pre-recorded responses of the second trial were played back; no new participant data was collected. Results were encouraging.

A fourth trial was conducted, with live participants. The recognition rate was about 98%. This was considered acceptable, that is, the acceptability threshold was no more than 98%. The script used in the fourth trial was defined to be the production script.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defind in the appended claims.

What is claimed is:

1. A method of creating a production script for interactions between participants and an automated data collection system, comprising the steps of:

conducting a trial in which a group of subjects provides utterances to the automated data collection system which is operative in accordance with an experimental script;

recording the utterances provided by the test subjects during the trial;

evaluating a recognition rate attained by the automated data collection system;

if the recognition rate is below an acceptability threshold, tuning the experimental script, repeating the step of conducting a trial using the tuned experimental script and the recorded utterances instead of utterances from a group of test subjects, and repeating the step of evaluating the recognition rate; and if the recognition rate is at least the acceptability threshold, using the experimental script, as selectively tuned, as the production script.

2. A method of creating a production script for interactions between participants and an automated data collection system, comprising the steps of:

conducting a trial in which a group of subjects provides utterances to the automated data collection system which is operative in accordance with an experimental script and which interacts with an external system to recognize utterances;

evaluating a recognition rate attained by the automated data collection system;

if the recognition rate is below an acceptability threshold, tuning the experimental script, repeating the step of conducting a trial using the tuned experimental script, and repeating the step of evaluating the recognition rate; and if the recognition rate is at least the acceptability threshold, using the experiental script, as selectively tuned, as the production script.

3. A method of creating a production script for interactions between participants and an automated data collection system, comprising the steps of:

conducting a trial in which a group of subjects provides utterances to the automated data collection system which is operative in accordance with an experimental script;

evaluating a recognition rate attained by the automated data collection system;

if the recognition rate is below an acceptability threshold, tuning the experimental script, repeating the step of conducting a trial using the tuned experimental script, and repeating the step of evaluating the recognition rate; and if the recognition rate is at least the acceptability threshold, using the experimental script, as selectively tuned, as the production script;

wherein the script has a prompt and a corresponding recognition grammar that includes a semi-constrained vocabulary recognition response grammar.

* * * * *